United States Patent
Coronado et al.

(10) Patent No.: US 8,214,551 B2
(45) Date of Patent: Jul. 3, 2012

(54) USING A STORAGE CONTROLLER TO DETERMINE THE CAUSE OF DEGRADED I/O PERFORMANCE

(75) Inventors: Juan Alonso Coronado, Tucson, AZ (US); Christina Ann Lara, Tucson, AZ (US); Beth Ann Peterson, Tucson, AZ (US); Justin David Suess, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 12/684,940

(22) Filed: Jan. 9, 2010

(65) Prior Publication Data

US 2011/0173350 A1    Jul. 14, 2011

(51) Int. Cl.
*G06F 13/00*    (2006.01)
*G06F 3/00*    (2006.01)

(52) U.S. Cl. .................. 710/19; 710/8; 710/15
(58) Field of Classification Search ............... 710/8, 15, 710/19
See application file for complete search history.

(56) References Cited

U.S. PATENT DOCUMENTS

| | | | |
|---|---|---|---|
| 5,491,791 A * | 2/1996 | Glowny et al. | 714/37 |
| 6,738,933 B2 | 5/2004 | Fraenkel et al. | |
| 7,047,450 B2 | 5/2006 | Iwamitsu et al. | |
| 7,305,462 B2 | 12/2007 | Nakamura et al. | |
| 7,412,448 B2 | 8/2008 | Agarwal et al. | |
| 2003/0051191 A1* | 3/2003 | Circenis et al. | 714/25 |
| 2003/0084335 A1* | 5/2003 | Moran et al. | 713/200 |
| 2006/0259274 A1 | 11/2006 | Greco et al. | |
| 2008/0177698 A1 | 7/2008 | Agarwal et al. | |

FOREIGN PATENT DOCUMENTS

EP    0723228 A1    7/1996

* cited by examiner

*Primary Examiner* — Tanh Nguyen
(74) *Attorney, Agent, or Firm* — Nelson and Nelson; Daniel P. Nelson; Alexis V. Nelson

(57) ABSTRACT

A method for identifying the cause of degraded I/O performance between a host system and a storage controller includes initially monitoring I/O performance between the host system and the storage controller. The method further detects degraded I/O performance between the host system and the storage controller using any suitable technique. Once degraded I/O performance is detected, the method determines the cause of the degraded I/O performance by analyzing historical configuration records in the storage controller. These historical configuration records enable the storage controller to correlate the degraded I/O performance with configuration changes in the storage controller and/or the connected host systems. The method then notifies one or more host systems of the cause of the degraded I/O performance. A corresponding apparatus and computer program product are also disclosed herein.

24 Claims, 8 Drawing Sheets

USING A STORAGE CONTROLLER TO DETERMINE THE CAUSE OF DEGRADED I/O PERFORMANCE

BACKGROUND

1. Field of the Invention

This invention relates to apparatus and methods for monitoring I/O performance, and more particularly to apparatus and methods for determining the cause of degraded I/O performance between a host system and a storage controller.

2. Background of the Invention

Storage networks, such as storage area networks (SANs), are frequently used to interconnect different types of data storage systems with different types of servers (also referred to herein as "host systems"). In many cases, the host systems and storage systems are tuned (i.e., configured) to optimize I/O performance between the host systems and storage systems. Modifying the configuration or settings of the host systems and/or storage systems has the potential to negatively affect I/O performance between the systems. Furthermore, degraded I/O performance between any particular host system and storage system can potentially affect the I/O performance between other host systems and storage systems connected thereto, thereby generating system-wide I/O performance problems.

In certain cases, a host system communicating with a storage system may include a performance measurement tool to monitor I/O performance between the host system and the storage system. For example, Resource Measurement Facility (RMF) is a performance measurement tool for z/OS-based host systems that monitors and records performance statistics between the host system and a connected storage system. Although tools such as RMF may be effective to measure and detect degraded I/O performance, such tools are limited in their ability to determine the cause or source of the degraded I/O performance. In certain cases, tracking down the cause or source of the problem may require many man-hours analyzing data from the affected host systems and/or storage systems. In worse case scenarios, determining the cause of the problem may involve recreating the problem with sniffers on both hardware and software in an attempt to determine the root cause.

In view of the foregoing, what are needed are apparatus and methods to more effectively determine the cause of degraded I/O performance between host systems and storage systems. Further needed are apparatus and methods to monitor configuration changes to host systems and storage systems the can potentially affect I/O performance. Yet further needed are apparatus and methods to notify host systems when I/O performance with a storage system has been degraded in a significant manner.

SUMMARY

The invention has been developed in response to the present state of the art and, in particular, in response to the problems and needs in the art that have not yet been fully solved by currently available apparatus and methods. Accordingly, the invention has been developed to provide apparatus and methods for identifying the cause of degraded I/O performance between a host system and a storage controller. The features and advantages of the invention will become more fully apparent from the following description and appended claims, or may be learned by practice of the invention as set forth hereinafter.

Consistent with the foregoing, a method for identifying the cause of degraded I/O performance between a host system and a storage controller is disclosed herein. In certain embodiments, such a method includes initially monitoring I/O performance between the host system and the storage controller. The method further detects degraded I/O performance between the host system and the storage controller using any suitable technique. Once the degraded I/O performance is detected, the method determines the cause of the degraded I/O performance by analyzing historical configuration records stored in the storage controller. These historical configuration records enable the storage controller to correlate the degraded I/O performance with configuration changes in the storage controller and/or connected host systems. The method then notifies one or more host systems of the cause of the degraded I/O performance. In certain embodiments, the method notifies all host systems connected to the storage controller or only notifies those host systems that are affected by the degraded I/O performance.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
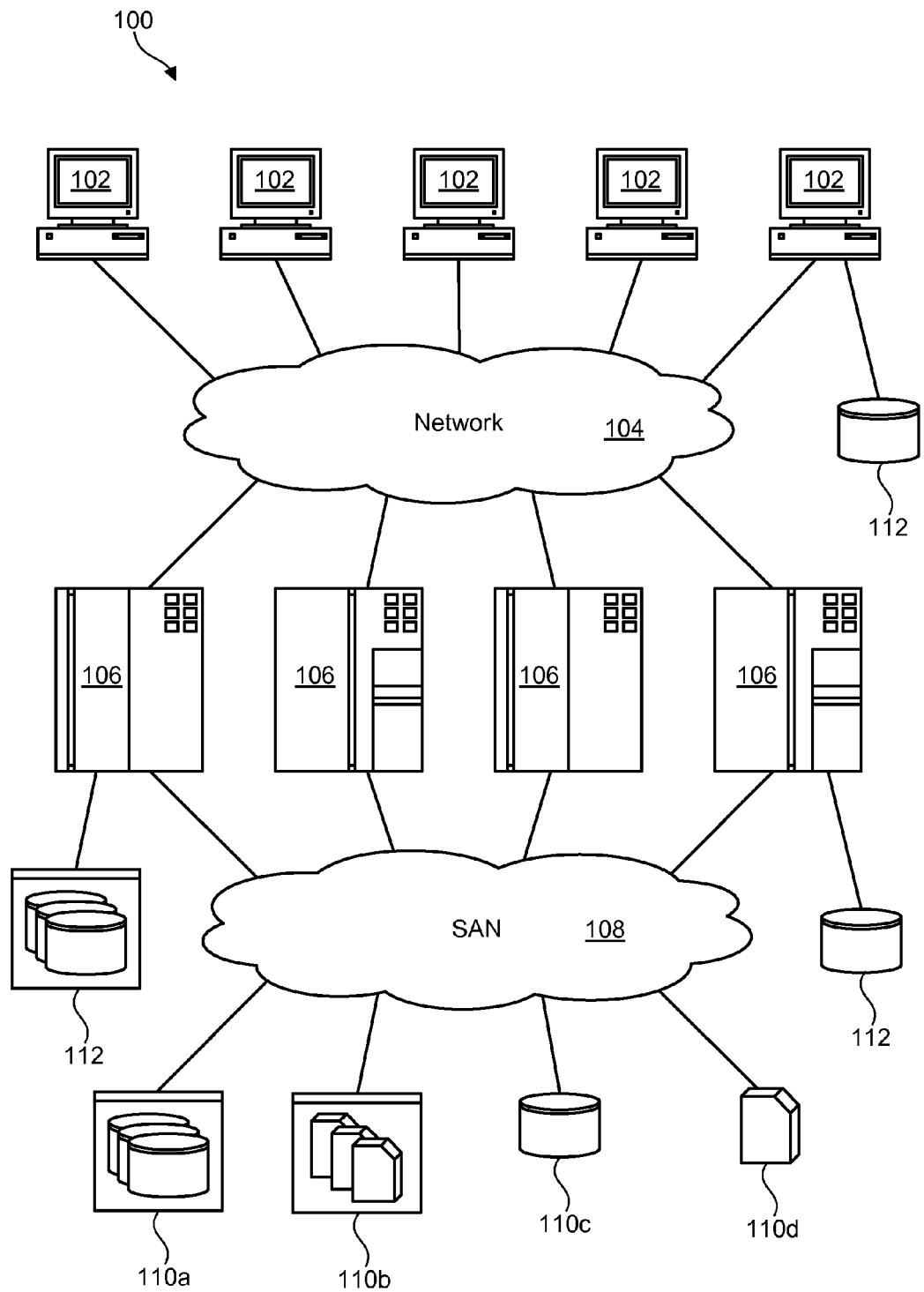
FIG. 1 is a high-level block diagram showing one example of a network environment in which an apparatus and method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, or semiconductor system, apparatus, or device. More specific examples (a non-exhaustive list) of the computer-readable storage medium may include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable storage medium may be any medium that can store the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a network architecture 100 is illustrated. The network architecture 100 is presented to show one example of an environment where an apparatus and method in accordance with the invention may be implemented. The network architecture 100 is presented only by way of example and is not intended to be limiting. Indeed, the apparatus and methods disclosed herein may be applicable to a wide variety of different computers, servers, storage devices, and network architectures, in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, client computers 102 may initiate communication sessions, whereas server computers 106 may wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like. One or more of the storage systems 112 may utilize the apparatus and methods described herein to identify the cause of degraded I/O performance between a storage system 112 and a host system 106.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC). One or more of the storage systems 110 may utilize the apparatus and methods described herein to identify the cause of degraded I/O performance between a storage system 110 and a host system 106.

Figure 2:
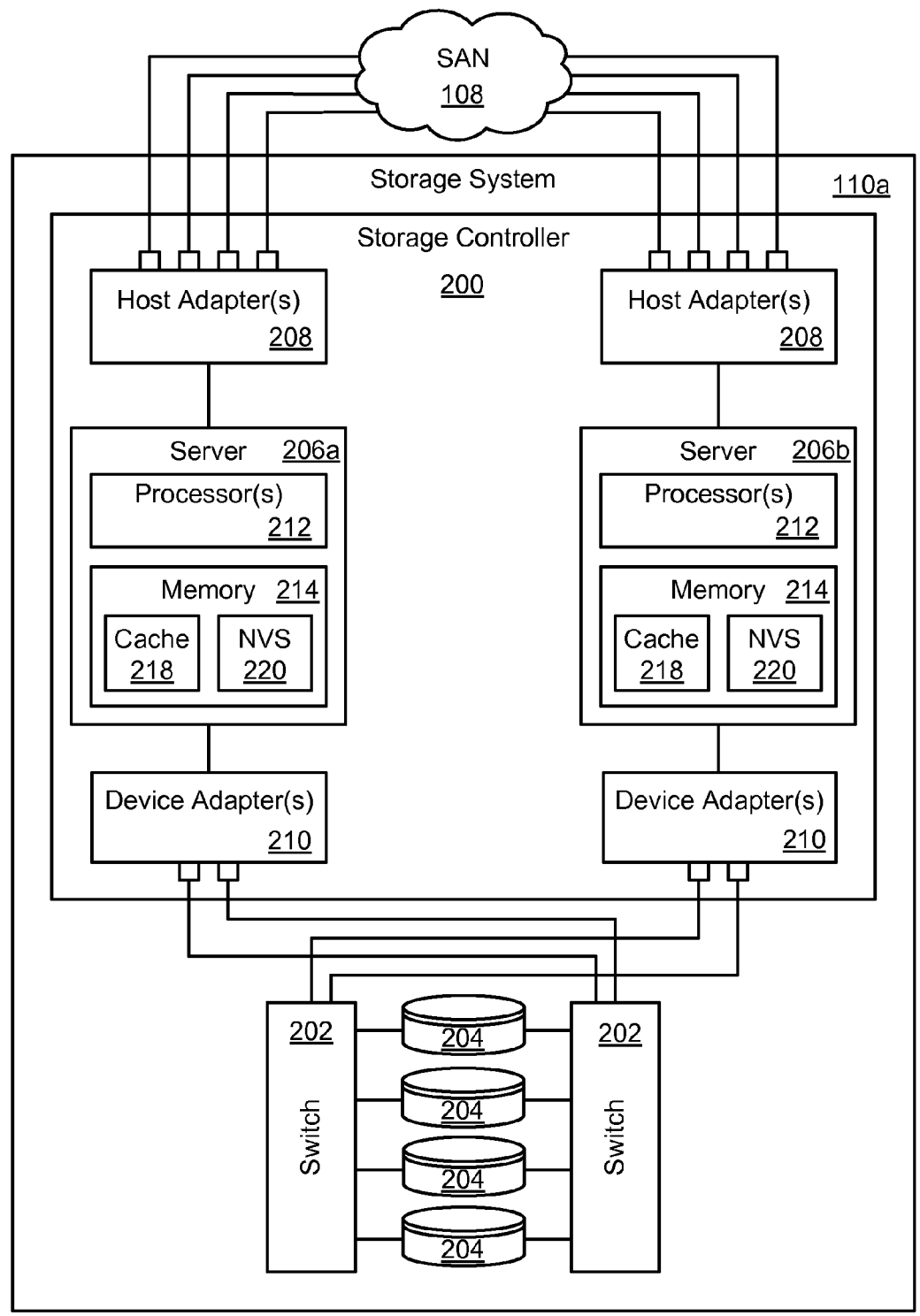
FIG. 2 is a high-level block diagram showing one example of a storage system in which various modules in accordance with the invention may be implemented.

Referring to FIG. 2, one embodiment of a storage system 110a containing an array of storage devices 204 (e.g., hard-disk drives 204 and/or solid-state drives 204) is illustrated. The internal components of the storage system 110a are shown since the apparatus and methods disclosed herein may, in certain embodiments, be implemented within such a storage system 110a, although the apparatus and methods may also be implemented within other storage systems 110, 112. As shown, the storage system 110a includes a storage controller 200, one or more switches 202, and one or more storage devices 204, such as hard-disk drives 204 or solid-state drives 204 (e.g., flash-memory-based drives 204). The storage controller 200 may enable one or more hosts 106 (e.g., open system and/or mainframe servers 106) to access data stored in the one or more storage devices 204.

As shown in FIG. 2, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may remain functional to ensure that I/O is able to continue between the hosts 106 and the storage devices 204. This process may be referred to as a "failover."

One example of a storage system 110a having an architecture similar to that illustrated in FIG. 2 is the IBM DS8000™ enterprise storage system. The DS8000™ is a high-performance, high-capacity storage controller providing disk storage that is designed to support continuous operations. The DS8000™ series models may use IBM's POWER5™ servers 206a, 206b, which may be integrated with IBM's virtualization engine technology. Nevertheless, the apparatus and methods disclosed herein are not limited to the IBM DS8000™ enterprise storage system 110a, but may be implemented in any comparable or analogous storage system 110 regardless of the manufacturer, product name, or components or component names associated with the storage system 110. Any storage system 110 that could benefit from one or more embodiments of the invention is deemed to fall within the scope of the invention. Thus, the IBM DS8000™ is presented only by way of example and is not intended to be limiting.

In selected embodiments, each server 206 includes one or more processors 212 (e.g., n-way symmetric multiprocessors) and memory 214. The memory 214 may include volatile memory (e.g., RAM) as well as non-volatile memory (e.g., ROM, EPROM, EEPROM, hard disks, flash memory, etc.). The volatile memory and non-volatile memory may store software modules that run on the processor(s) 212 and are used to access data in the storage devices 204. The servers 206 may host at least one instance of these software modules. These software modules may manage all read and write requests to logical volumes in the storage devices 204.

In selected embodiments, the memory 214 includes a cache 218. Whenever a host 106 performs a read operation, the server 206 that performs the read may fetch data from the storages devices 204 and save it in its cache 218 in the event it is required again. If the data is requested again by a host 106, the server 206 may fetch the data from the cache 218 instead of fetching it from the storage devices 204, saving both time and resources. Similarly, when a host 106 performs a write, the server 106 that receives the write request may store the write in its cache 218 and destage the write to the storage devices 204 at a later time. When a write is stored in cache 218, the write may also be stored in non-volatile storage (NVS) 220 of the opposite server 206b so that the write can be recovered by the opposite server 206b in the event the first server 206a fails.

Figure 3:
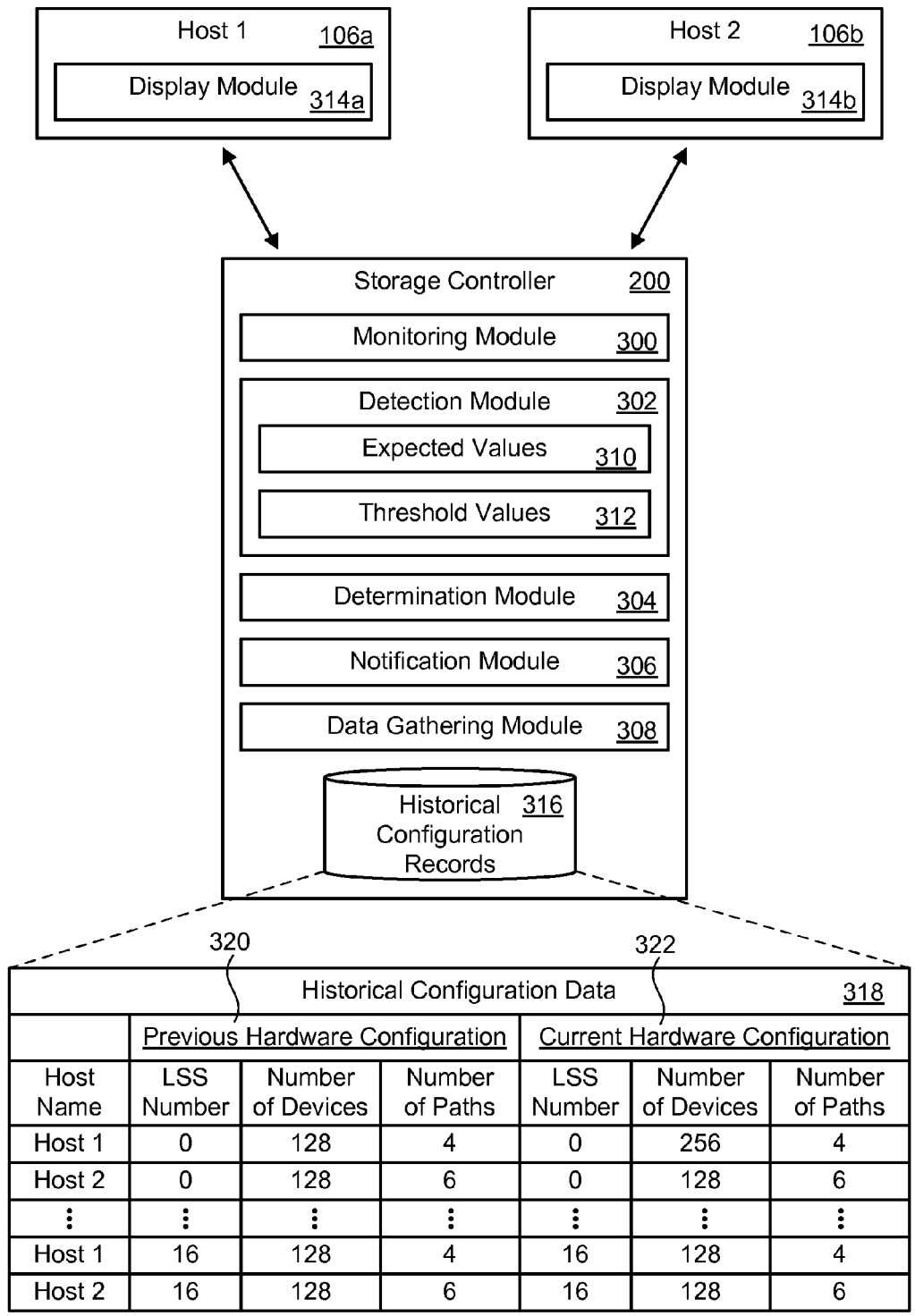
FIG. 3 is a high-level block diagram showing one embodiment of modules that may be used to implement an apparatus and method in accordance with the invention.

Referring to FIG. 3, apparatus and methods in accordance with the invention may be implemented in the form of one or more modules. These modules may be implemented in hardware, software or firmware executable on hardware, or a combination thereof. These modules are presented only by way of example and are not intended to be limiting. Indeed, alternative embodiments may include more or fewer modules than those illustrated. Furthermore, it should be recognized that, in some embodiments, the functionality of some modules may be broken into multiple modules or, conversely, the functionality of several modules may be combined into a single module or fewer modules. It should also be recognized that the modules are not necessarily implemented in the locations where they are illustrated. For example, some functionality shown in the storage controller 200 may actually be implemented in a host system 106 and vice versa. Other functionality shown only in the storage controller 200 may actually be distributed across the storage controller 200 and a host system 106. Thus, the location of the modules is presented only by way of example and is not intended to be limiting.

As shown in FIG. 3, in selected embodiments, a storage controller 200 may include one or more of a monitoring module 300, a detection module 302, a determination module 304, a notification module 306, and a data gathering module 308. The storage controller 200 may also include a repository storing historical configuration records 316. As will be explained in more detailer hereafter, the storage controller 200 may use these historical configuration records 316 to identify the cause of degraded I/O performance between a host system 106 and the storage controller 200.

A monitoring module 300 may be configured to monitor the I/O performance between a host system 106 and the storage controller 200. This may be accomplished, for example, by monitoring the data transmission rate between the host system 106 and the storage controller 200, counting the number of errors or timeouts that occur between the host system 106 and the storage controller 200, or monitoring other suitable metrics. A detection module 302 may be configured to detect when the I/O performance between the host system 106 and the storage controller 200 has degraded. For example, the detection module 302 may detect when the I/O performance falls below a performance threshold value 312 or negatively deviates some amount from an expected value 310 (such as an average value, target value, or the like). In certain embodiments, the performance threshold values 312 or expected values 310 may be collected or defined on a per host basis since the values 310, 312 for each host 106 may differ. In certain embodiments, the detection module 302 may verify that the negative deviation occurs for a selected amount of time to ensure that the deviation is not just temporary interruption or spike that will quickly return to a normal steady state.

Once it is determined that I/O performance has been degraded, a determination module 304 may determine the cause of the degraded I/O performance. This may be accomplished by analyzing historical configuration records 316 in the storage controller 200. A data gathering module 308 may gather and maintain these historical configuration records 316 as configuration changes are made to the connected host systems 106 and/or storage controller 200. In general, the historical configuration records 316 may record configuration changes for the host systems 106 and/or the storage controller 200 over a period of time. These records 316 may be stored in a table 318 or other suitable data structure 318. When degraded I/O performance is detected, the determination module 304 may analyze any configuration changes that occurred to host systems 106 and/or the storage controller 200 to determine the cause of the degraded I/O performance. If configuration changes did occur at or near the time the degraded I/O performance was detected, the determination module 304 may determine that the degraded I/O performance was caused by the configuration changes.

Once the cause of the degraded I/O performance has been determined, the notification module 306 may notify one or more hosts 106 of the cause of the degraded I/O performance. This will allow system administrators to address the cause of the degraded I/O performance such as by reversing configuration changes or altering a host's or storage controller's configuration in a way that addresses the problem. In certain embodiments, the notification module 306 only notifies the host system 106 that directly caused the degraded I/O performance. In other embodiments, the notification module 306 notifies all host systems 106 that are affected by the degraded I/O performance. For example, certain host systems 106, although not the direct cause of the degraded I/O performance, may be negatively affected (by having their own I/O performance affected, for example) by configuration changes on other host systems 106. In such cases, the notification module 306 may notify the system administrators of all affected host systems 106 so they can take appropriate action. In yet other embodiments, the notification module 306 notifies all host systems 106 that are connected to the storage controller 200, regardless of whether they are negatively affected.

When a notification is received by a host system 106, a display module 314 may display the notification. This will notify a system administrator or other user of the problem and the cause of the problem. In certain embodiments, the display module 314 will display the notification automatically. In other embodiments, the display module 314 will display the notification in response to user input, such as in response to the user clicking an icon or issuing a command.

To illustrate the operation of the above-described modules 300, 302, 304, 306, consider historical configuration data 318 showing a previous hardware configuration 320 and a current hardware configuration 322 for two host systems 106a, 106b ("Host 1" and "Host 2"). Assume that a system administrator configured the first host system 106a with 16 logical subsystems (LSSs), with each LSS including 128 devices (i.e., logical volumes) and four logical paths for communication. Further assume that the system administrator configured the second host system 106b with 16 LSSs, with each LSS including 128 devices and six logical paths for communication. Assume that additional devices are added to the storage system 110a to accommodate a new application on the host system 106a or to accommodate additional users on an existing application on the host system 106a. As shown in FIG. 3, the number of devices associated with LSS 0 of Host 1 increases from 128 to 256. However, the number of logical paths between the host system 106a and the storage controller 200 does not change to accommodate the I/O to these new devices. In effect, adding the new devices without any additional logical paths funnels the I/O for these new devices through the existing logical paths.

Assume that the detection module 302 detects degraded I/O performance for I/O directed to one or more volumes of LSS 0 of Host 1 after the above-stated configuration changes have been made. Upon detecting the degraded I/O performance, the determination module 304 analyzes the historical configuration records 316 to determine if any configuration changes may have caused the degradation. Upon determining that the number of devices in LSS 0 of Host 1 increased without any increase in the number of logical paths between Host 1 and the storage controller 200, the determination module 304 may determine that the additional devices caused the I/O performance degradation. The notification module 306 may then notify the host system 106a that caused the I/O performance degradation. This will enable a system administrator to change the configuration (such as by deleting devices or adding logical paths to accommodate the additional devices) to restore the desired I/O performance.

Degraded I/O performance may occur for a variety of reasons and is not limited to the example presented above. For example, I/O performance may be degraded by adding new applications to a production environment. Without additional configuration changes to accommodate a new application, the application may consume additional resources which may degrade I/O performance. In other cases, I/O performance may be degraded by adding new users to an existing application. These new users may place additional stress on the storage controller, thereby degrading I/O performance. In other cases, an application with increasing hardware resource demands may eventually cause I/O performance degradation. In yet other cases, I/O performance may be degraded by assigning additional logical devices to an application without additional configuration changes to accommodate the new logical devices.

In other cases, I/O performance degradation may be caused by the loss of a physical path between a host 106 and a storage controller 200. This may cause one or more logical paths to be lost between the host 106 and the storage controller 200 (since several logical paths may travel over a single physical path). The loss of the physical path may be due to maintenance or a hardware failure such as a host and/or storage controller port failure. The loss of one or more logical paths may cause degraded I/O performance without a change in I/O throughput to compensate for the lost resources.

In others cases, I/O performance degradation may be observed in a remote copy environment where a primary storage controller 200 mirrors I/O to a secondary storage controller 200 over one or more logical paths. These logical paths may pass through a switch or other hardware. The loss of a physical path between the primary storage controller 200 and the secondary storage controller 200 may cause one or more logical paths to be lost, thereby negatively affecting I/O performance. In such cases, the host system 106 may be notified that the loss of the physical path is the cause of the I/O performance degradation.

Figure 4:
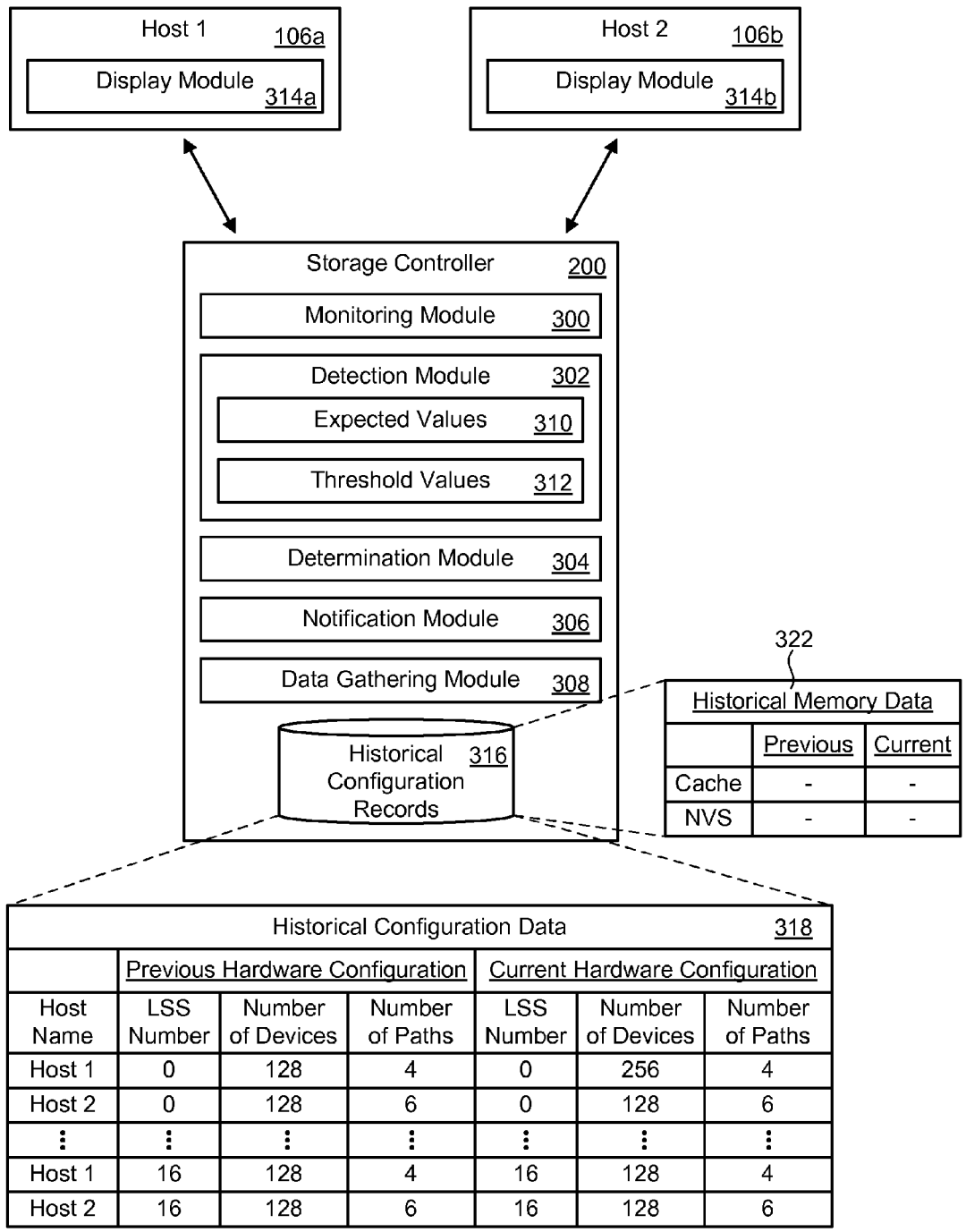
FIG. 4 is a high-level block diagram showing an alternative embodiment of modules that may be used to implement an apparatus and method in accordance with the invention.

Referring to FIG. 4, in selected embodiments, the historical configuration records 316 may be augmented to include historical memory data 322. This historical memory data 322 may record previous and current amounts of cache 218 and NVS 220 in the storage controller 200. As the storage controller 200 processes I/O, memory failures may cause the amount of available cache 218 or NVS 220 to decrease. This may cause an increased number of cache misses, thereby degrading I/O performance. When the detection module 302 detects degraded I/O performance, the determination module 304 may analyze the amount of usable space in the cache 218 and the NVS 220. If the amount of usable space in the cache 218 or NVS 220 falls below a selected threshold, the determination module 304 may determine that the degraded I/O performance is the result of the decreased space. In such cases, the notification module 306 may notify connected hosts 106 that degraded I/O performance is the result of a smaller usable cache 218 and/or NVS 220.

Figure 5:
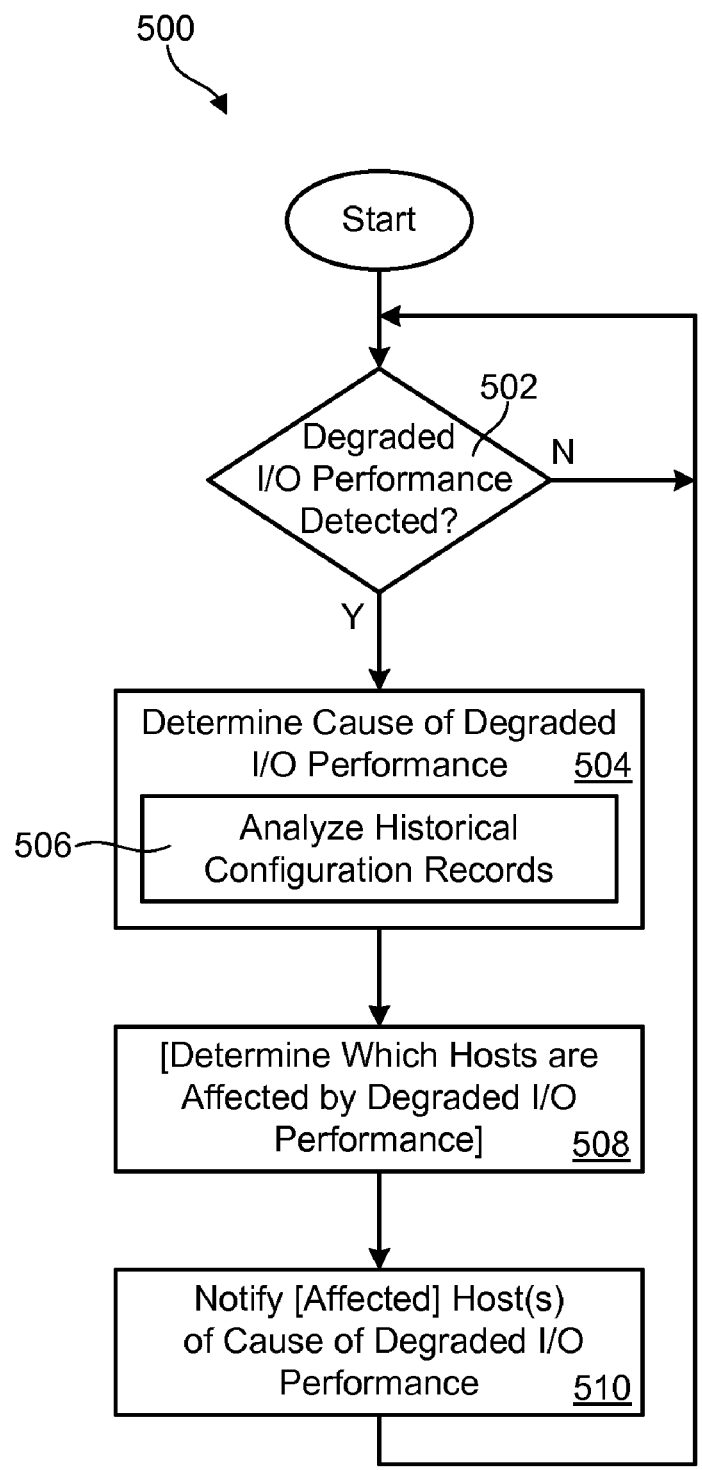
FIG. 5 is a flow chart showing one embodiment of a method for identifying the cause of degraded I/O performance between a host system and a storage controller.

Referring to FIG. 5, one embodiment of a method 500 for identifying the cause of degraded I/O performance between a host system 106 and a storage controller 200 is illustrated. As shown, the method 500 initially determines 502 whether degraded I/O performance is detected. If degraded I/O performance is detected, the method 500 determines 504 the cause of the degraded I/O performance. In doing so, the method 500 may analyze 506 historical configuration records 316 in an attempt to correlate the degraded I/O performance with one or more configuration changes in the hosts systems 106 and/or storage controller 200.

Once the method 500 has determined the cause of the degraded I/O performance, the method 500 optionally determines 508 which hosts 106 are affected by the degraded I/O performance. The method 500 may then notify 510 one or more hosts of the cause of the degraded I/O performance. This may include notifying the host 106 that caused the degraded I/O performance, the hosts 106 that are affected by the degraded I/O performance, or all hosts 106 that are connected to the storage controller 200.

Figure 6:
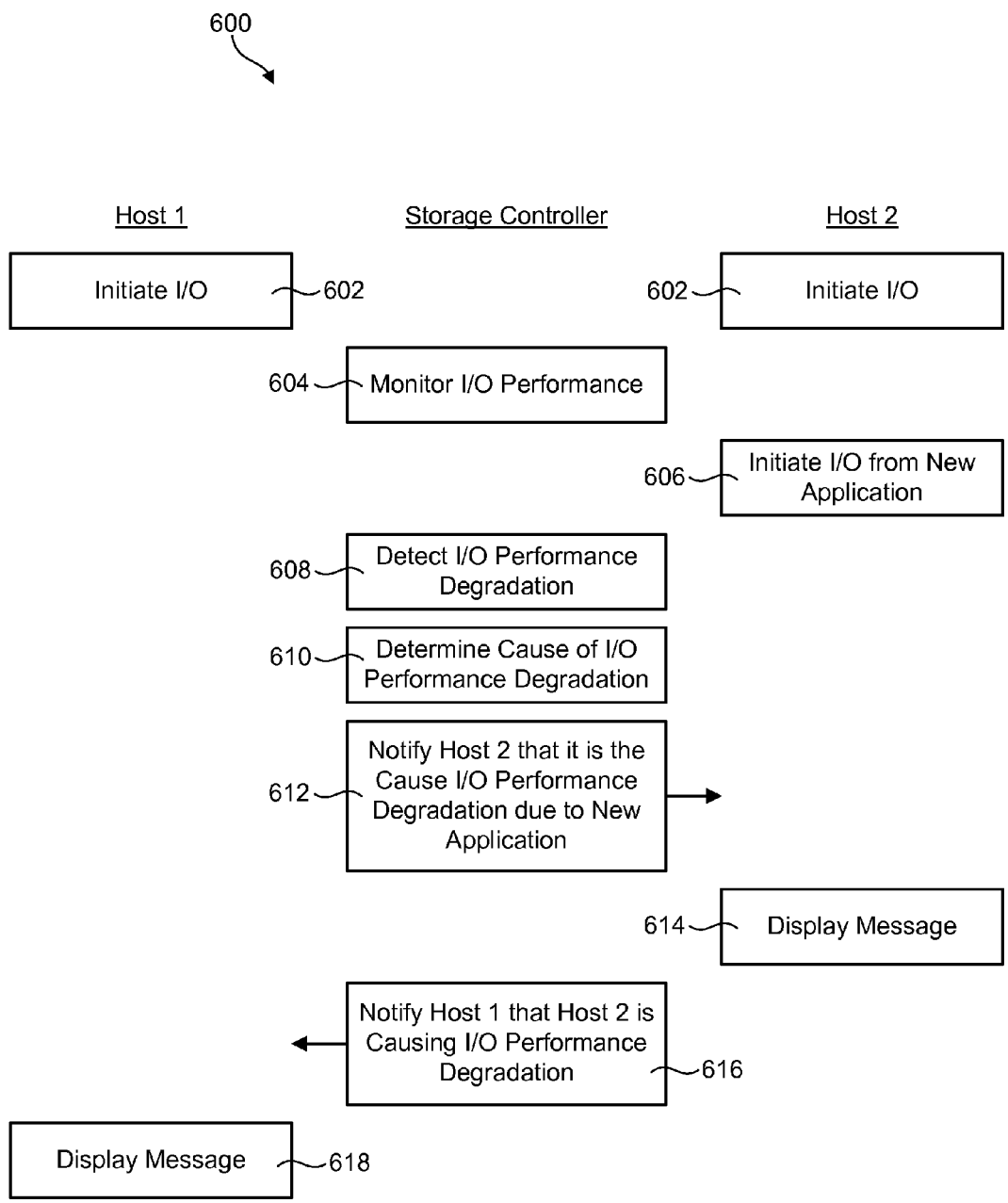
FIG. 6 is a sequence diagram showing a first scenario for identifying a cause of degraded I/O performance between a host system and a storage controller.
Figure 7:
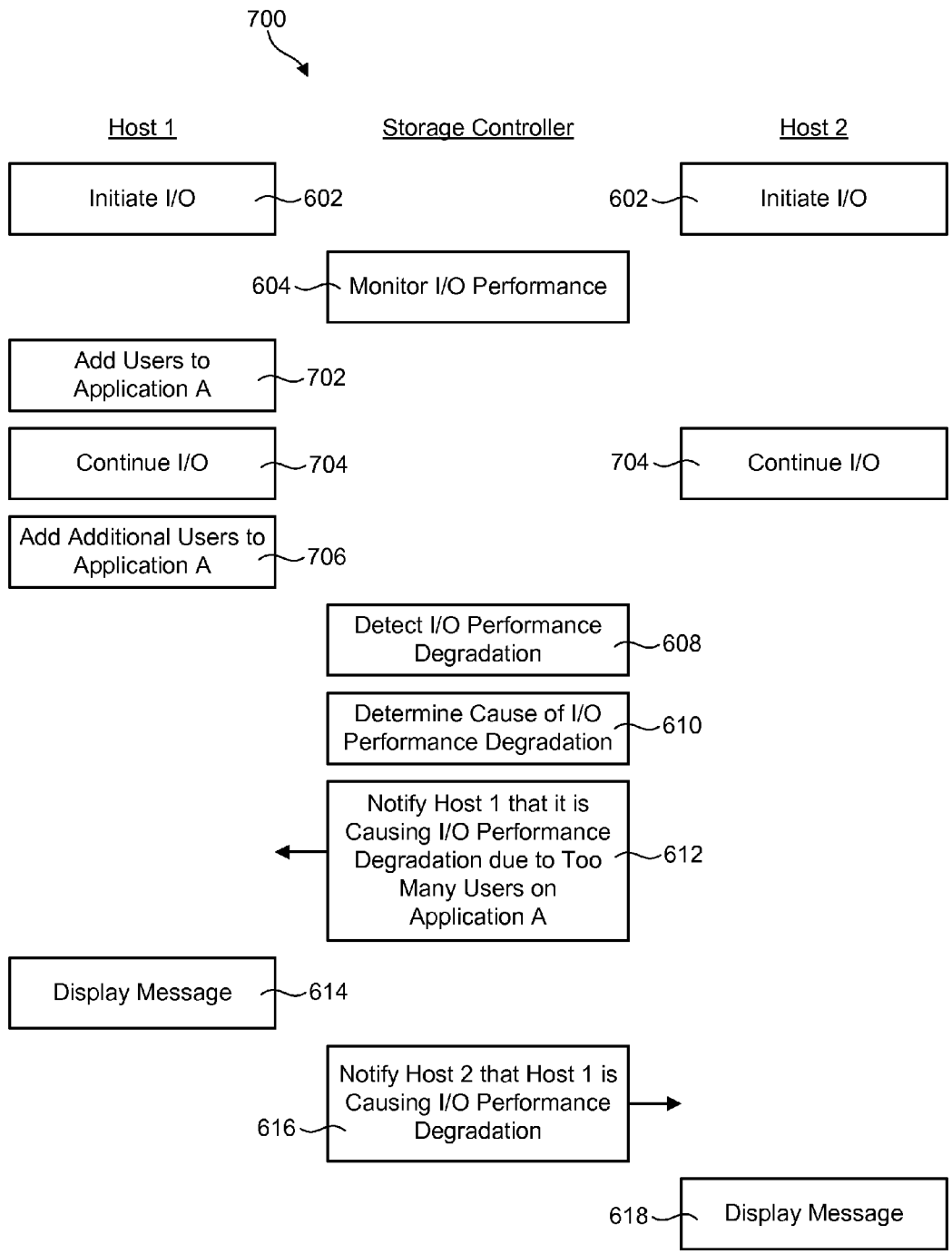
FIG. 7 is a sequence diagram showing a second scenario for identifying a cause of degraded I/O performance between a host system and a storage controller.
Figure 8:
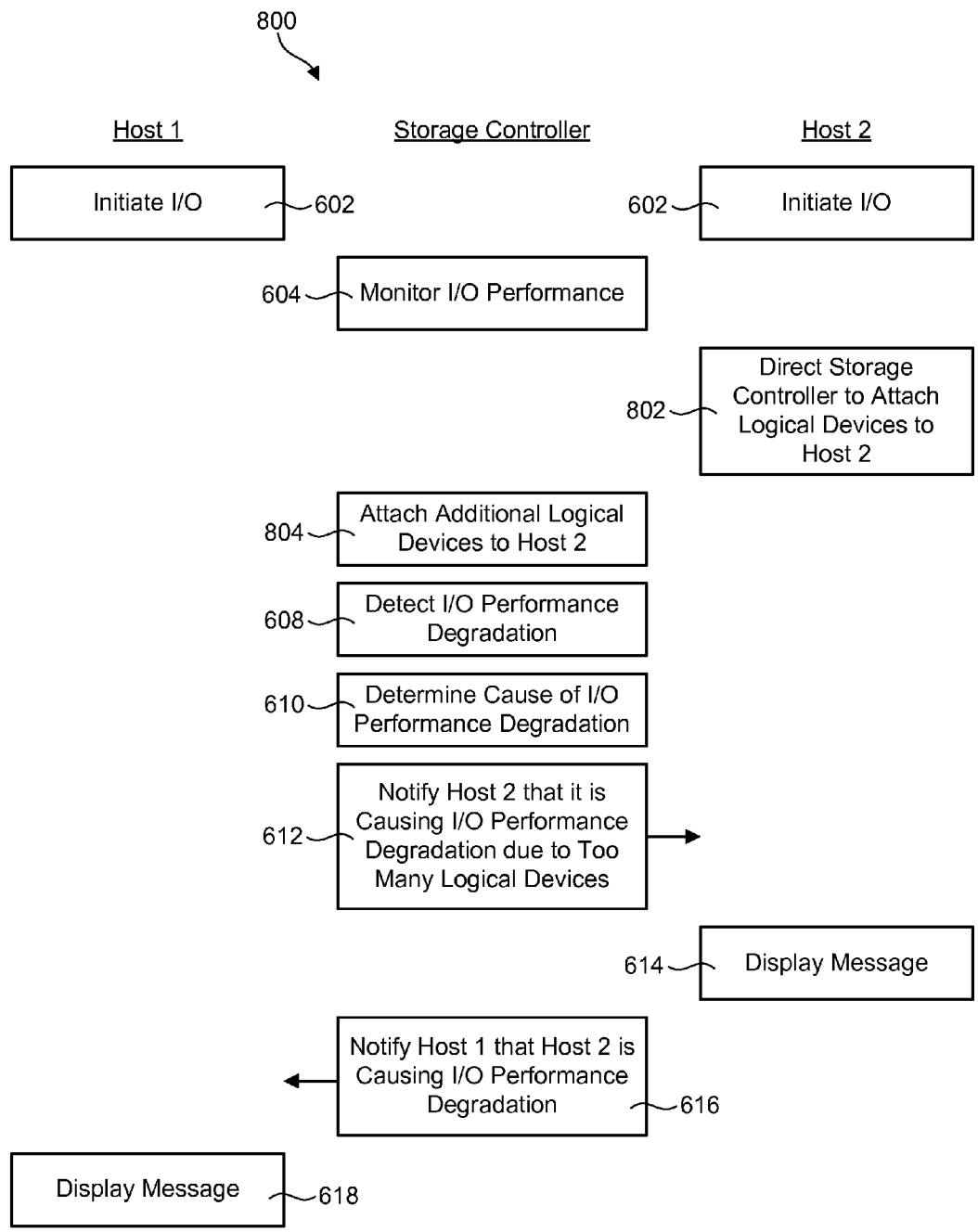
FIG. 8 is a sequence diagram showing a third scenario for identifying a cause of degraded I/O performance between a host system and a storage controller.

Referring to FIGS. 6 through 8, several different scenarios showing the communication between a host system 106 and a storage controller 200 are illustrated. Each scenario shows various steps that may be performed to identify the cause of degraded I/O performance between the host system 106 and the storage controller 200. These scenarios are presented by way of example and are not intended to be limiting. Thus, different variations of these scenarios are possible and within the scope of the invention.

Referring to FIG. 6, a first scenario 600 for identifying the cause of degraded I/O performance between a host system 106 and a storage controller 200 is illustrated. In this scenario 600, first and second host systems 106a, 106b initiate 602 I/O with a storage controller 200. The storage controller 200, in turn, monitors 604 the I/O performance between the host systems 106a, 106b and the storage controller 200.

In this scenario, the second host system 106b initiates 606 I/O from a new application that degrades I/O performance between the second host system 106b and the storage controller 200. This degraded I/O performance may but does not necessarily affect the I/O performance between the first host system 106a and the storage controller 200. The storage controller 200 detects 608 the I/O performance degradation and determines 610 the cause of the I/O performance degradation by analyzing the historical configuration records 316. The storage controller 200 then notifies 612 the second host 106b that it is causing the I/O performance degradation as a result of the new application. The second host 106b may display 614 this message, thereby allowing a system administrator to take corrective action. Optionally, the storage controller 200 may also notify 616 the first host 106a that the second host 106b is causing I/O performance degradation. The first host 106a may also display 618 the message.

Referring to FIG. 7, a second scenario 700 for identifying the cause of degraded I/O performance between a host system 106 and a storage controller 200 is illustrated. In this scenario 700, first and second host systems 106a, 106b initiate 602 I/O with a storage controller 200. The storage controller 200, in turn, monitors 604 the I/O performance between the host systems 106a, 106b and the storage controller 200.

In this scenario, the first host system 106a adds 702 users to application A and the host systems 106a, 106b continue 704 I/O with the storage controller 200. The first host system 106b then adds 706 additional users to application A such that the I/O performance between the first host device 106a and the storage controller 200 is degraded. This degraded I/O performance may, but does not necessarily, affect the I/O performance between the second host system 106b and the storage controller 200. The storage controller 200 detects 608 the I/O performance degradation and determines 610 the cause of the I/O performance degradation by analyzing the historical configuration records 316. The storage controller 200 then notifies 612 the first host 106a that it is causing I/O performance degradation as a result of too many users using application A. The first host 106a may display 614 this message to enable a system administrator to take corrective action. Optionally, the storage controller 200 may notify 616 the second host 106b that the first host 106a is causing I/O performance degradation. The second host 106b may also display 618 the message.

Referring to FIG. 8, a third scenario 800 for identifying the cause of degraded I/O performance between a host system 106 and a storage controller 200 is illustrated. In this scenario 800, first and second host systems 106a, 106b initiate 602 I/O with a storage controller 200. The storage controller 200 monitors 604 the I/O performance between the host systems 106a, 106b and the storage controller 200.

In this scenario, the second host system 106b directs 802 the storage controller 200 to attach one or more logical devices (i.e., logical volumes) to the second host system 106b. The storage controller 200 then attaches 804 the one or more logical devices. This attachment causes I/O performance degradation between the second host system 106b and the storage controller 200. This degraded I/O performance may but does not necessarily affect the I/O performance between the first host system 106a and the storage controller 200.

The storage controller 200 detects 608 the I/O performance degradation and determines 610 the cause of the I/O performance degradation by analyzing the historical configuration records 316. The storage controller 200 then notifies 612 the second host 106b that it is causing I/O performance degradation as a result of the newly attached logical devices. The second host 106b may display 614 this message to enable a system administrator to take corrective action. Optionally, the storage controller 200 may notify 616 the first host 106a that the second host 106b is causing I/O performance degradation. The first host 106a may then display 618 the message so a system administrator can take appropriate action.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for addressing degraded I/O performance between a host system and a storage controller, the method comprising:

monitoring I/O performance between a plurality of host systems and a storage controller;

assigning, on a per host basis, an acceptable I/O performance level for each host system that communicates with the storage controller;

detecting when the I/O performance of a first host system of the plurality of host systems falls below its acceptable I/O performance level, thereby resulting in degraded I/O performance for the first host system;

analyzing historical configuration records stored in the storage controller to identify a second host system that initiated configuration changes that caused the degraded I/O performance of the first host system;
notifying the first host system that the second host system is the cause of the degraded I/O performance; and
notifying the second host system that it is the cause of the degraded I/O performance.

2. The method of claim 1, further comprising notifying the first host system of the configuration changes that caused the degraded I/O performance.

3. The method of claim 1, further comprising notifying the second host system of the configuration changes that caused the degraded I/O performance.

4. The method of claim 1, further comprising notifying all of the plurality of host systems that the second host system is the cause of the degraded I/O performance.

5. The method of claim 1, further comprising notifying all of the plurality of host systems that are negatively affected by the degraded I/O performance that the second host system is the cause of the degraded I/O performance.

6. The method of claim 1, wherein the historical configuration records document at least one of hardware and software configuration changes for the plurality of host systems.

7. The method of claim 1, wherein the historical configuration records document at least one of hardware and software configuration changes for the storage controller.

8. The method of claim 1, further comprising altering, by a system administrator, the configuration changes that caused the degraded I/O performance.

9. A computer program product to address degraded I/O performance between a host system and a storage controller, the computer program product comprising a computer-readable storage medium having computer-usable program code embodied therein, the computer-usable program code comprising:
computer-usable program code to monitor I/O performance between a plurality of host systems and a storage controller;
computer-usable program code to assign, on a per host basis, an acceptable I/O performance level for each host system that communicates with the storage controller;
computer-usable program code to detect when the I/O performance of a first host system of the plurality of host systems falls below its acceptable I/O performance level, thereby resulting in degraded I/O performance for the first host system;
computer-usable program code to analyze historical configuration records stored in the storage controller to identify a second host system that initiated configuration changes that caused the degraded I/O performance of the first host system;
computer-usable program code to notify the first host system that the second host system is the cause of the degraded I/O performance; and
computer-usable program code to notify the second host system that it is the cause of the degraded I/O performance.

10. The computer program product of claim 9, further comprising computer-usable program code to notify the first host system of the configuration changes that caused the degraded I/O performance.

11. The computer program product of claim 9, further comprising computer-usable program code to notify the second host system of the configuration changes that caused the degraded I/O performance.

12. The computer program product of claim 9, further comprising computer-usable program code to notify all of the plurality of host systems that the second host system is the cause of the degraded I/O performance.

13. The computer program product of claim 9, further comprising computer-usable program code to notify all of the plurality of host systems that are negatively affected by the degraded I/O performance that the second host system is the cause of the degraded I/O performance.

14. The computer program product of claim 9, wherein the historical configuration records document at least one of hardware and software configuration changes for the plurality of host systems.

15. The computer program product of claim 9, wherein the historical configuration records document at least one of hardware and software configuration changes for the storage controller.

16. The computer program product of claim 9, further comprising computer-usable program code to enable a system administrator to alter the configuration changes that caused the degraded I/O performance.

17. An apparatus to address degraded I/O performance between a host system and a storage controller, the apparatus comprising:
a monitoring module to monitor the I/O performance between a plurality of host systems and a storage controller, the plurality of host systems being assigned, on a per host basis, an acceptable I/O performance level for communicating with the storage controller;
a detection module to detect when the I/O performance of a first host system of the plurality of host systems falls below its acceptable I/O performance level, thereby resulting in degraded I/O performance for the first host system;
a determination module to analyze historical configuration records stored in the storage controller to identify a second host system that initiated configuration changes that caused the degraded I/O performance of the first host system; and
a notification module to notify the first host system that the second host system is the cause of the degraded I/O performance, and notify the second host system that it is the cause of the degraded I/O performance.

18. The apparatus of claim 17, wherein the notification module is further configured to notify the first host system of the configuration changes that caused the degraded I/O performance.

19. The apparatus of claim 17, wherein the notification module is further configured to notify the second host system of the configuration changes that caused the degraded I/O performance.

20. The apparatus of claim 17, wherein the notification module is configured to notify all of the plurality of host systems that the second host system is the cause of the degraded I/O performance.

21. The apparatus of claim 17, wherein the notification module is configured to notify all of the plurality of host systems that are negatively affected by the degraded I/O performance that the second host system is causing the degraded I/O performance.

22. The apparatus of claim 17, wherein the historical configuration records document at least one of hardware and software configuration changes for the plurality of host systems.

23. The apparatus of claim 17, wherein the historical configuration records document at least one of hardware and software configuration changes of the storage controller.

24. The apparatus of claim 17, further comprising a display module to display the cause of the degraded I/O performance.

* * * * *